(12) United States Patent
Terahara

(10) Patent No.: US 6,222,655 B1
(45) Date of Patent: *Apr. 24, 2001

(54) WAVELENGTH DIVISION MULTIPLEX OPTICAL AMPLIFICATION TRANSMISSION SYSTEM AND OPTICAL AMPLIFIER

(75) Inventor: Takafumi Terahara, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/007,655

(22) Filed: Jan. 15, 1998

(30) Foreign Application Priority Data

Aug. 11, 1997 (JP) ................................... 9-216853

(51) Int. Cl.⁷ ..................................... H04J 14/02
(52) U.S. Cl. ........................ 359/124; 359/134; 359/161; 359/173; 359/177; 359/179; 359/341
(58) Field of Search ................................. 359/124, 161, 359/173, 177, 179, 134, 341

(56) References Cited

U.S. PATENT DOCUMENTS

| | | | |
|---|---|---|---|
| 5,530,583 | * 6/1996 | Uno et al. | 359/341 |
| 5,563,733 | * 10/1996 | Mitsuda et al. | 359/341 |
| 5,654,816 | * 8/1997 | Fishman | 359/177 |
| 5,706,125 | * 1/1998 | Nakano | 359/341 |
| 5,880,874 | * 3/1999 | Shibuya et al. | 359/337 |
| 5,900,970 | * 5/1999 | Kakui | 359/341 |
| 5,912,750 | * 6/1999 | Takeda et al. | 359/124 |
| 5,912,754 | * 6/1999 | Koga et al. | 359/179 |
| 6,043,922 | * 6/1996 | Koga et al. | 359/193 |

FOREIGN PATENT DOCUMENTS 4-147114    5/1992   (JP) .

* cited by examiner

Primary Examiner—Leslie Pascal
Assistant Examiner—Hanh Phan
(74) Attorney, Agent, or Firm—Staas & Halsey LLP

(57) ABSTRACT

A wavelength division multiplex optical amplification transmission system has a broad signal wavelength band and can be easily constructed. A transmission line provided between a lightwave transmitting terminal station and a lightwave receiving terminal station is constructed of optical amplifiers, optical filters and a transmission line. Structuring the transmission line involves the use of an optical amplifier utilizing high-concentration Al added EDFA, thereby proving a module excluding the optical filters with a gain wavelength characteristic in which a gain peak exists within a target wavelength range that should be a signal wavelength band, and there is an ill-balanced symmetry with respect to the gain peak in the target wavelength range. Used is the optical filter given a loss wavelength characteristic in which a loss maximum wavelength with a maximum loss exists in the target wavelength range, a gain simply decreases as a distance from the loss maximum wavelength increases within the target wavelength range, and a characteristic obtained by adding the loss wavelength characteristics is relatively coincident in values with the gain wavelength characteristic.

10 Claims, 8 Drawing Sheets

WAVELENGTH DIVISION MULTIPLEX OPTICAL AMPLIFICATION TRANSMISSION SYSTEM AND OPTICAL AMPLIFIER

BACKGROUND OF THE INVENTION

1. Field of the Invention

The present invention relates to a wavelength division multiplex optical amplification transmission system for relaying and transmitting a plurality of optical signals having different wavelengths by use of an optical amplifier, and to an optical amplifier used in this wavelength division multiplex optical amplification transmission system.

2. Description of the Related Art

One communication system using optical signals is a system in which a plurality of optical signals having different wavelengths are, after being multiplexed, transmitted and relayed via an optical amplifier (which will hereinafter be referred to as a wavelength division multiplex optical amplification transmission system).

When constructing the wavelength division multiplex optical amplification transmission system, a lightwave receiving terminal station is so constructed as to deal with, as communication information, only the optical signal levels which fall within a predetermined range (the lightwave receiving terminal station can not be constructed so that signals having arbitrary levels are recognized as communication information). Therefore, a condition that the level of the optical signal must fall within the predetermined range is imposed on the optical signal (outputted from the transmission line) inputted to the lightwave receiving terminal station. Then, a level of the optical signal outputted from the transmission line is determined by a level of the optical signal when inputted to the transmission line and a gain of the transmission line with respect to this optical signal. It is therefore desirable that the transmission line used in the wavelength division multiplex optical amplification transmission system be after all the one in which the gain does not depend on the wavelength.

An optical amplifier represented by an erbium-doped fiber amplifier (EDFA) and used for constituting the transmission line, however, as shown in FIG. 8, has a gain wavelength characteristic in which the gain varies corresponding to the wavelength. Accordingly, when the transmission line is constructed of only the optical amplifiers and optical fibers, it follows that this transmission line exhibits a gain wavelength characteristic in which the gain varies corresponding to the wavelength. Further, the gain wavelength characteristic is that a gain dependency on the wavelength becomes higher with a greater number of optical amplifiers provided in the transmission line Hence, the wavelength division multiplex optical amplification transmission system including the transmission line constructed of only the optical amplifiers and the optical fibers, presents problems wherein the number of optical signals that can be multiplexed is small (a signal wavelength band is narrow), and a transmission distance can not be increased without narrowing the signal wavelength band.

In order to obviate such problems arising because of the transmission line gain depending upon the wavelength, in the wavelength division multiplex optical amplification transmission system, the gain of the transmission line (the optical amplifiers) becomes independent on the wavelength (which is called gain equalization) by inserting a gain equalizer defined as a kind of the optical filter into the transmission line. That is, it has been practiced that the gain of the transmission line is fixed by inserting into the transmission line the gain equalizer exhibiting a loss wavelength characteristic assuming the same configuration as the gain wavelength characteristic possessed by the transmission line.

A characteristic of which the gain equalizer is demanded and a method of constructing (designing) the prior art gain equalizer will hereinafter be specifically explained.

FIG. 9 schematically shows a construction of the wavelength division multiplex optical amplification transmission system involves the use of the gain equalizer. As shown in FIG. 9, the gain is equalized by providing a single gain equalizer 32 in every section containing normally a plurality (generally, 5–10 units) of optical amplifiers 31. More specifically, each gain equalizer is designed and manufactured to have a loss wavelength characteristic including a wavelength area in which a configuration is coincident (relative values are equal) with a gain wavelength characteristic of a structure (hereinafter referred to as an equalization target module) obtained by connecting the optical amplifier 31 to the optical fiber through no intermediary of the gain equalizer 32, which are contained in the corresponding section.

In the wavelength division optical amplification transmission system including the gain equalizers, the wavelength area is used as a signal wavelength band, and hence, as a matter of course, it is required that the gain equalizer be designed to have a loss wavelength characteristic the configuration of which is coincident with a gain wavelength characteristic of the equalization target module in a broad wavelength range. Even if a width of the wavelength range where the configurations are coincident is the same, a level of the optical signal after the gain equalization may differ in the case where their positions are different. For example, if a corresponding relationship between the gain wavelength characteristic of the equalization target module and the loss wavelength characteristic of the gain equalizer is as shown in FIG. 10(A), the optical signal after the gain equalization assumes a level corresponding to a gain Ga at a lower limit in a wavelength range where the configurations are coincident. By contrast, if the corresponding relationship between the gain wavelength characteristic of the equalization target module and the loss wavelength characteristic of the gain equalizer is as shown in FIG. 10(B), the width of the wavelength range usable as the signal wavelength band is the same as that shown in FIG. 10(A), however, the optical signal after the gain equalization assumes a level corresponding to a gain Gb larger than the gain Ga.

It is desirable that the level of the optical signal after the gain equalization be higher because the level is one of the parameters for determining a relay distance. Namely, it is desirable that an equalizer loss ΔLmax be small. Further, if the level of the optical signal after equalizing the gain is the same, as a matter of course, it is better to have a broader wavelength range usable as the signal wavelength band. Therefore, the gain equalizer is desired to have the loss wavelength characteristic the configuration of which is coincident with the gain wavelength characteristic over the entire wavelength range in which the gain of the equalization target module is equal to or greater than a given value.

Incidentally, it never happens that a manufactured gain equalizer has a loss wavelength characteristic the configuration of which is equal to the desired gain wavelength characteristic as shown in FIGS. 10(A) and 10(B) up to such a wavelength that the loss comes to "0". An actual loss wavelength characteristic of the gain equalizer is coincident in terms of its configuration (a relative value) with the desired gain wavelength characteristic with respect to only a portion in which the loss is above a certain value (Lo; a value called a excessive loss) as shown in FIG. 11. Namely, the level of the optical signal after the gain equalization corresponds to not the gain Ga at the lower limit wavelength in the signal wavelength band but to a gain Ga' smaller by the excessive loss Lo than Ga. Therefore, the gain equalizer is desired to have an excessive loss, Lo, as small as possible.

A conventional method of manufacturing (designing) the gain equalizer will hereinafter be described. Now, the normal optical filter (the one that can be manufactured at a high precision and assured in its reliability: e.g., a dielectric multilayer filter, an etalon filter and a Mach-Zehnder filter) has a gain wavelength characteristic with a high symmetry. It is therefore impossible to compensate an asymmetrical gain wavelength characteristic possessed by the equalization target module (the optical amplifier) in a broad wavelength if a gain equalizer is constructed of the single optical filter, and a situation as illustrated in FIG. 11 occurs.

Such being the case, it has been practiced that the gain equalizer having the loss wavelength characteristic assuming a configuration more approximate to the desired gain wavelength characteristic is obtained by combining a plurality of optical filters each having a loss wavelength characteristic with a periodicity.

For instance, according to a technique reported on p.4 onward of "First Optoelectric and Communications Conference Technical Digest, July 1996, Makuhari Messe", as shown in FIG. 12, the gain equalizer is structured by combining two Mach-Zehnder filters respectively Free Spectral Ranges FSRs (a difference between two adjacent loss maximum wavelengths) of 6 nm and 25 nm. Further, techniques of constructing gain equalizers by combining a plurality of Mach-Zehnder filters are also disclosed on pp. 982–983 of "ELECTRONICS LETTERS 9th June 1994 Vol.30 No.12" and Japanese Patent Laid-Open Publication No.4-147114 as well.

Disclosed further on p.578 of the report of preliminary articles in the Communications Society Convention by the Japanese Electronic Information Communications Association is a technique of constructing a gain equalizer by combining two etalon filters having loss wavelength characteristics corresponding to two sine waves with different periods, into which the gain wavelength characteristic of EDFA defined as an equalization target is developed by Fourier transform.

As known very well, the function of an arbitrary configuration can be expressed by a sum of some functions having periodicity. Accordingly, as in the prior art, even the gain equalizer assuming the loss wavelength characteristic in any configuration can be manufactured by combining the optical filters having the loss wavelength characteristics exhibiting the periodicity. Generally the excessive loss, however, becomes larger when a greater number of optical filters are combined. Therefore, a wavelength range, (i.e., a signal wavelength band) in which the gain can be equalized by the gain equalizer constructed by combining the optical filters having the loss wavelength characteristics exhibiting the periodicity, is on the order or 15 nm at the maximum.

SUMMARY OF THE INVENTION

It is a primary object of the present invention to provide a wavelength division multiplex optical amplification transmission system that has a broader signal wavelength band and can be manufactured more easily than by the prior art.

It is another object of the present invention to provide an optical amplifier by which the above wavelength division multiplex optical amplification transmission system can be actualized.

To accomplish the above objects, according to a first aspect of the present invention, a wavelength division multiplex optical amplification transmission system comprises a lightwave transmitting terminal station for multiplexing a plurality of optical signals having wavelength different from each other and transmitting these signals, a transmission line for connecting a plurality of optical amplifiers to a plurality of optical filters in a vertical row, and a lightwave receiving terminal station for receiving the plurality of optical signals transmitted by the lightwave transmitting terminal station via the transmission line. When constructing the wavelength division multiplex optical amplification transmission system, the plurality of optical amplifiers to be used herein each have a gain wavelength characteristic in which a gain maximum wavelength value with a maximum gain exists in a wavelength range containing all wavelengths of the plurality of optical signals, the gain simply decreases as a distance from the gain maximum wavelength value increases within the wavelength range, and a gain wavelength characteristic is asymmetrical with respect to the gain maximum wavelength value. Further, each of the plurality of optical filters exhibits a loss wavelength characteristic in which a loss maximum wavelength value exists within the wavelength range, and a loss simply decreases as a distance from the loss maximum wavelength value increases within the wavelength range. Then, a loss wavelength characteristic obtained by adding loss wavelength characteristics of the plurality of optical filters having at least two different loss wavelength characteristics, is relatively coincident in terms of values with gain wavelength characteristics of the plurality of optical amplifiers within the wavelength range.

If such a construction is adopted, it is feasible to easily determine a combination of the loss wavelength characteristics in which the gain equalization can be optimized, i.e., a combination of the optical filters in which the gain equalization can be implemented over a wide wavelength range in a state where an excessive loss is decreased. Hence, the wavelength division multiplex optical amplification transmission system having a broad signal wavelength band can be actualized more easily than by the prior art.

According to a second aspect of the present invention, a wavelength division multiplex optical amplification transmission system comprises a lightwave transmitting terminal station for multiplexing a plurality of optical signals having wavelength different from each other and transmitting these signals, a transmission line for connecting a plurality of optical amplifiers to a plurality of gain equalizers in vertical rows, and a lightwave receiving terminal station for receiving the plurality of optical signals transmitted by the lightwave transmitting terminal station via the transmission line. When actualizing the wavelength division multiplex optical amplification transmission system, each of the plurality of optical amplifiers has a gain wavelength characteristic in which a gain maximum wavelength value with a maximum gain exists in a wavelength range containing all wavelengths of the plurality of optical signals, the gain simply decreases as a distance from the gain maximum wavelength value increases within the wavelength range, and a gain wavelength characteristic is asymmetrical with respect to the gain maximum wavelength value. Further, each of the plurality of gain equalizers equalizes a gain in a block constructed of a predetermined number of optical amplifiers among the plurality of optical amplifiers. Moreover, each gain equalizer is constructed by combining the plurality of optical filters each exhibiting a loss wavelength characteristic in which a loss maximum wavelength value exists within the wavelength range and a loss simply decreases as a distance from the loss maximum wavelength value increases within the wavelength range, wherein a loss wavelength characteristic obtained by adding loss wavelength characteristics of the plurality of optical filters having at least two different loss wavelength characteristics, is relatively coincident with a gain wavelength characteristic in the block within the wavelength range.

Namely, according to the second aspect of the present invention, the wavelength division multiplex optical amplification transmission system is constructed so that the gain equalization takes place per block. When adopting this construction, it is feasible to easily manufacture the wavelength division multiplex optical amplification transmission system exhibiting excellent performance, which comprises the transmission line including a multiplicity of optical amplifiers.

Furthermore, according to the present invention, an optical amplifier, used for constructing the wavelength division multiplex optical amplification transmission system, for amplifying a plurality of wavelength-multiplexed optical signals, comprises an optical amplifying unit exhibiting a gain wavelength characteristic in which a gain maximum wavelength value with a maximum gain exists in a wavelength range containing all wavelengths of the plurality of optical signals, the gain simply decreases as a distance from the gain maximum wavelength value increases within the wavelength range, and a gain wavelength characteristic is asymmetrical with respect to the gain maximum wavelength value. The optical amplifier also comprises a gain equalizing unit constructed by combining a plurality of optical filters each exhibiting a loss wavelength characteristic in which a loss maximum wavelength value exists within the wavelength range, and a loss simply decreases as a distance from the loss maximum wavelength value increases within the wavelength range, wherein a loss wavelength characteristic obtained by adding loss wavelength characteristics of the plurality of optical filters having at least two different loss wavelength characteristics, is relatively coincident with a gain wavelength characteristic of the optical amplifying unit within the wavelength range.

When adopting this construction, it is possible to easily determine a combination of the loss wavelength characteristics in which the gain equalization can be optimized, i.e., a combination of the optical filters in which the gain equalization can take place over a wide wavelength range in a state where the excessive loss is decreased. The optical amplifier capable of equalizing the gain in the broad wavelength range can be therefore actualized, and, as a result, the wavelength division multiplex optical amplification transmission system having the broad signal wavelength band can be attained more easily than by the prior art.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Illustrative embodiments of the present invention will hereinafter be described with reference to the accompanying drawings.

<First Embodiment>

Figure 1:
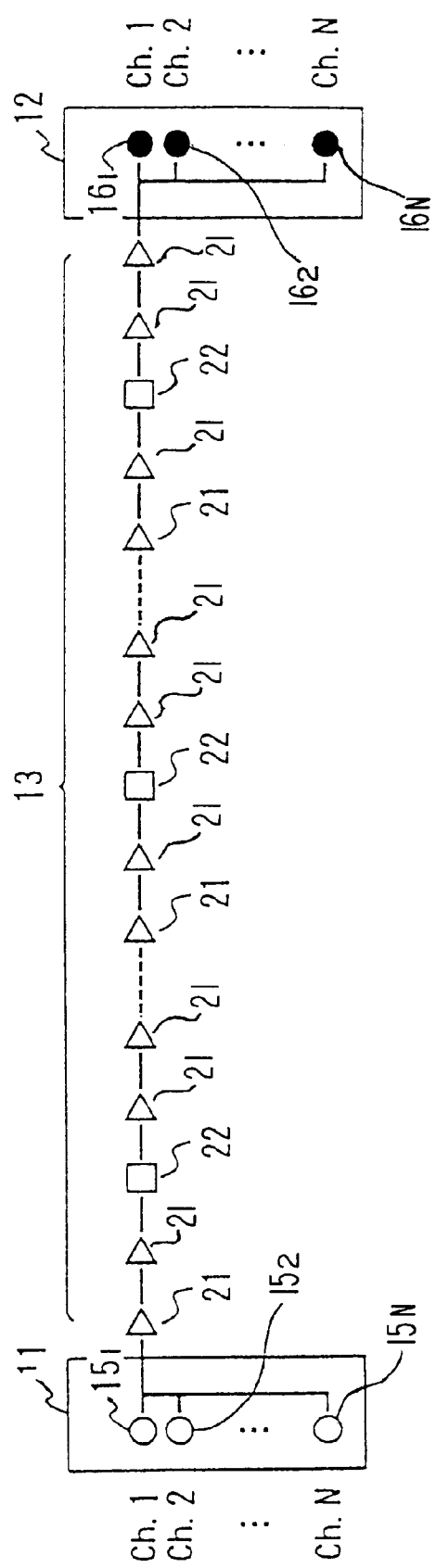
FIG. 1 is a diagram schematically showing a construction of a wavelength division multiplex optical amplification transmission system in a first embodiment of the present invention.

FIG. 1 schematically shows a construction of a wavelength division multiplex optical amplification transmission system in accordance with a first embodiment of the present invention. As illustrated in FIG. 1, the wavelength division multiplex optical amplification transmission system is constructed of a lightwave transmitting terminal station 11, a lightwave receiving terminal station 12 and a transmission line 13.

Figure 2:
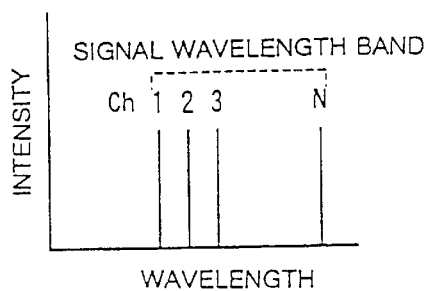
FIG. 2 is a diagram illustrating an optical spectrum of a transmission signal transmitted via a transmission line of the wavelength division multiplex optical amplification transmission system in the first embodiment.

The lightwave transmitting terminal station 11 includes N-units of lightwave transmitters 15 ($15_1$, $15_2$, . . . $15_N$) corresponding respectively to channels 1–N. The respective lightwave transmitters 15 output optical signals having the same level and wavelengths allocated for the corresponding channels. As a result, the lightwave transmitting terminal station 11, as shown in FIG. 2, outputs a beam of signal lightwave into which the optical signal outputted from each transmitter 15 is multiplexed.

As shown in FIG. 1, the lightwave receiving terminal station 12 includes N-units of lightwave receiver 16 ($16_1$, $16_2$, . . . $16_N$) for receiving optical signals for the channels 1–N.

Further, the transmission line 13 is constructed of a plurality of optical amplifiers 21, a plurality of equalizers 22, and a transmission line (an optical fiber) for connecting the optical amplifiers to the equalizers 22. In the optical amplifier 21 used herein, a structure (termed an equalization target module) formed by connecting components excluding the equalizers 22 in vertical rows in the transmission line 13 has a gain wavelength characteristic in which a gain maximum wavelength with a maximum gain exists within a signal wavelength band, the gain simply becomes smaller as a distance from the gain maximum wavelength becomes larger in a first wavelength range containing the signal wavelength band, and a symmetry with respect to the gain maximum wavelength is balanced worse than in the equalization target module of the conventional gain equalizer.

Note that the gain wavelength characteristic, in which the gain simply becomes smaller as the distance from the gain maximum wavelength becomes larger in the first wavelength range containing the signal wavelength band, implies a gain wavelength characteristic in which the gain simply increases from a lower limit wavelength up to the gain maximum wavelength in the first wavelength range, the gain comes to the maximum at the gain maximum wavelength, and thereafter the gain simply decreases to an upper limit wavelength in the signal wavelength band. For an explanatory convenience, the same gain wavelength characteristic is also referred to as a gain wavelength characteristic showing a simple peak characteristic within the first wavelength range.

Providing the equalization target module with the above gain wavelength characteristic (in which a single peak characteristic is exhibited in a first wavelength range, and a symmetry is ill-balanced), can be attained by using, as the optical amplifier 21, EDFA having a gain peak in the vicinity of, e.g., 1558 nm. The gain wavelength characteristic of EDFA depends on an EDFA length, a kind of dopant, a concentration of dopant, an exciting power, a gain and an operating state of EDFA, and therefore EDFA having a gain peak in the vicinity of 1558 nm can be actualized by adjusting those factors.

Each of the equalizers 22 is constructed of a certain number (at least one) of optical filters. Each optical filter to be used is the one in which a loss maximum wavelength with a maximum loss exists in a second wavelength range, and having such a loss wavelength characteristic that a loss simply becomes smaller as a distance from the loss maximum wavelength becomes larger in the second wavelength range. In other words, there is used the optical filter (in which the loss wavelength characteristic exhibits the simple peak characteristic in the second wavelength range) wherein a periodicity is not recognized in the loss wavelength characteristic in at least the second wavelength range.

A variety of such optical filters exists, however, it is desirable that a dielectric multilayer optical filter and an etalon filter be used in terms of considering a reliability and a manufacturing accuracy.

Note that the second wavelength range is a range included in the first wavelength range defined as a range in which the equalization target module exhibits the simple peak characteristic, wherein the upper and lower limit wavelengths are determined by such two wavelengths as to equalize the gain of the equalization target module. More specifically, the gain of the equalization target module used for determining the second wavelength range is determined based on the loss allowed for equalizing the gain, and thereafter the second wavelength range is determined.

The number of the optical filters used for constituting the transmission line 13 and the loss characteristic of each optical filter is determined so that relative values with respect to an added result of the loss wavelength characteristic of each optical filter and the gain wavelength characteristic of the equalization target module are coincident within the second wavelength range under such a condition as to use the optical filter in which the loss wavelength characteristic exhibits the simple peak characteristic within the second wavelength range.

The wavelength division optical amplification transmission system in the first embodiment is constructed by dispersively disposing, on a plurality of transmission lines, a plurality of optical filters manufactured based on the data (the number of the optical filters, and the loss wavelength characteristic of each optical filer) set by the above procedures.

<Second Embodiment>

Figure 3:
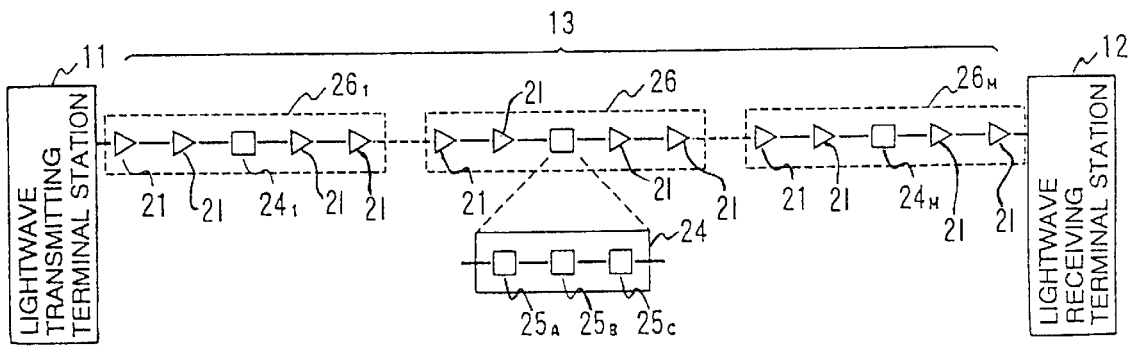
FIG. 3 is a diagram schematically showing a construction of the wavelength division multiplex optical amplification transmission system in a second embodiment of the present invention.

FIG. 3 schematically shows a construction of a wavelength division multiplex optical amplification transmission system-in accordance with a second embodiment of the present invention. As illustrated in FIG. 3, the wavelength division multiplex optical amplification transmission system is constructed of the lightwave transmitting terminal station 11, the lightwave receiving terminal station 12 and a transmission line 13. The lightwave transmitting terminal station 11 and the lightwave receiving terminal station 12 are the same as those provided in the wavelength division multiplex optical amplification transmission system in the first embodiment.

The transmission line 13 is constructed of a plurality of optical amplifiers 21, M-units of gain equalizers 24 and a plurality of transmission lines. Further, the M-units of gain equalizers 24 are each constructed of a plurality of optical filters 25.

In the wavelength division multiple optical amplification transmission system in the second embodiment, the transmission line 13 is sectioned into M-pieces of blocks 26 each containing one gain equalizer 24 and K-units (normally, 5 through 10 units) of optical amplifiers 21.

On the occasion of actualizing the transmission line 13 including the blocks 26 structured differently, the number of the optical filters 25 used for constituting the gain equalizer 24 in the block 26 and the loss wavelength characteristic of each optical filter 25 are obtained per block 26 in the same procedures as those in the first embodiment. Namely, the number of the optical filters 25 used in the gain equalizer 24 within each block 26 and the loss wavelength characteristic that should be given to each optical filter 25, are obtained under such a condition that only the optical filter in which the loss wavelength characteristic exhibits the simple peak characteristic within a predetermined wavelength range (a second wavelength area) set as being a signal wavelength band. Then, the gain equalizer 24 for each block 26 is constructed by combining the optical filters 25 so manufactured as to have the thus obtained loss wavelength characteristic, and the transmission line 13 is constructed by incorporating each gain equalizer 24 into the corresponding block 26.

Further, when actualizing the transmission line 13 in which the respective blocks 26 each have the same construction, the number of the optical filters 25 used for constituting the gain equalizer 24 and the loss wavelength characteristic of each optical filter 25 are obtained with respect to a certain block 26, and, based on a result thereof, gain equalizers 24 having the same construction are incorporated into each block 26.

Next, the wavelength division multiplex optical amplification transmission system illustrated in FIG. 3 will be explained in greater detail.

The wavelength division multiplex optical amplification transmission system which will hereinafter be described, is a system in which an optical amplifier 21 involves the use of high-concentration Al added EDFA, and each block 26 includes seven units of optical amplifiers 21 (K=7).

Figure 4:
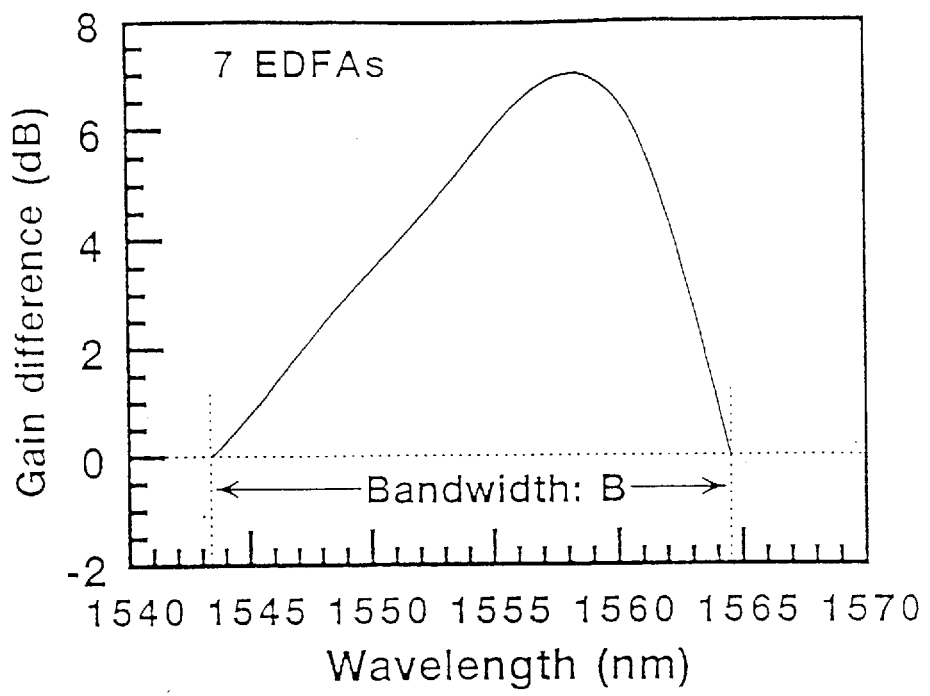
FIG. 4 is an explanatory diagram of the embodiment of the present invention, showing a gain wavelength characteristic of an equalization target module containing high-concentration Al added EDFA.
Figure 5:
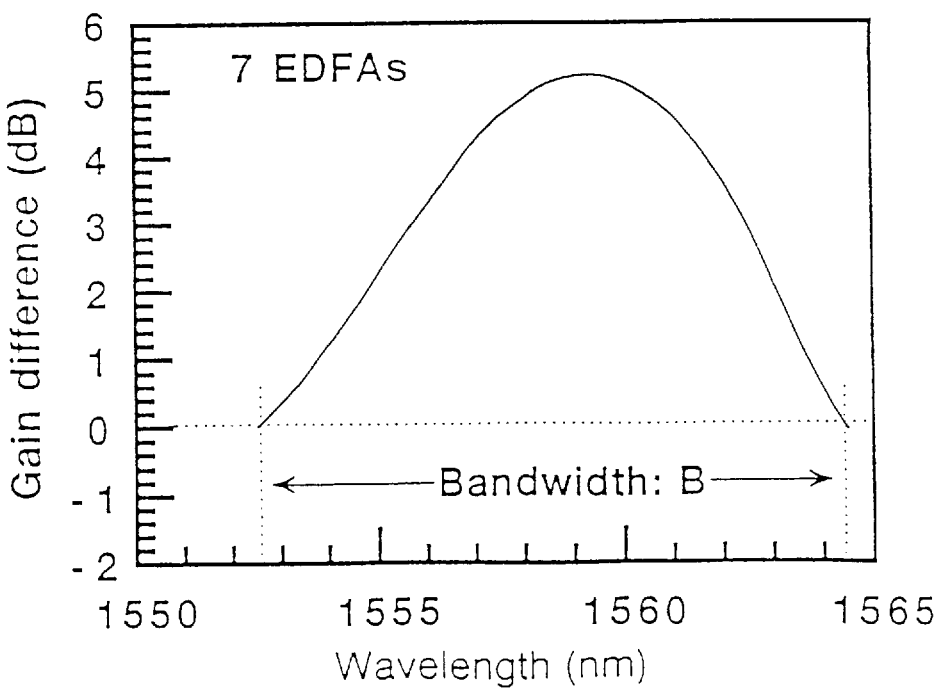
FIG. 5 is a diagram showing a gain wavelength characteristic of the equalization target module containing low-concentration Al added EDFA.

The high-concentration Al added EDFA has a worse-balanced symmetry with respect to the gain peak wavelength of approximately 1558 nm in the gain wavelength characteristic than in generally-used low-concentration Al added EDFA. Therefore, the gain wavelength characteristic of the module (the equalization module of the gain equalizer 22) excluding the gain equalizer 22 within each block 26 is such that the symmetry with respect to the gain peak wavelength is also, as shown in FIG. 4, balanced worse than the symmetry in the loss wavelength characteristic (FIG. 5) of the equalization target module of the conventional gain equalizer.

Thus, after the gain wavelength characteristic of the equalization target module of the gain equalizer 22 has been set to have a configuration different from the conventional one, the gain equalizer 22 is designed (the number of the optical filters 25 provided in the gain equalizer 22 and the loss wavelength characteristic of each optical filter 25, are determined).

The procedures thereof will hereinafter be described in greater detail.

The optical filter known at the present is classified into a dielectric multilayer filter, an etalon filter, a Mach-Zehnder filter, a wave-guiding channel type filter, and a fiber grating. What is required of the optical filter 25 for constituting the equalizer 22 is that (1) a change with a passage of time and a variation in temperature must be small (the reliability must be vouched for), and (2) a high manufacturing accuracy with respect to the loss wavelength characteristic must be obtained (the optical filter must be manufactured to have a loss wavelength characteristic as it is designed). The dielectric multilayer filter and the etalon filter among the variety of optical filters given above may be taken into consideration as the optical filters satisfying the conditions (1) and (2). Hence, the gain equalizer 24 is constructed by combining the dielectric multilayer filter with the etalon filter.

The loss wavelength characteristic of the gain equalizer constructed by the combination of the dielectric multilayer filter and the etalon filter, is a total sum of the loss wavelength characteristics of the dielectric multilayer filter and of the etalon filter that are combined with each other. Namely, a function $Lg(\lambda)$ representing the loss wavelength characteristic of the gain equalizer is expressed by the following formula:

$$Lg(\lambda) = \Sigma Ld(\lambda) + \Sigma Le(\lambda) \qquad (1)$$

where $Ld(\lambda)$: the function representing the loss wavelength characteristic of the dielectric multilayer filter, and $Le(\lambda)$: the function representing the loss wavelength characteristic of the etalon filter.

Further, it is known that the function $Le(\lambda)$ [unit: dB] representing the loss wavelength characteristic of the etalon filter is expressed by the following formula:

$$Le(\lambda) = 10 \log_{10}[1+(10^{(Le/10)}-1)\cos^2\{\pi(\lambda-\lambda m)/FSR\}] \qquad (2)$$

where $\lambda me$ is the maximum loss wavelength, Le[dB] is the maximum/minimum loss difference, and FSR (Free Spectral Range) is the wavelength difference between two maximum loss wavelengths adjacent to each other. Further, the etalon filter is used as a band hindrance optical filter exhibiting the simple peak characteristic, and hence a restriction of being larger than a width of the wavelength band B in which the gain should be equalized is imposed on a value of FSR.

Then, the function $Le(\lambda)$ [unit: dB] representing the loss wavelength characteristic of the band hindrance optical filter (of a single cavity type) using the dielectric multilayer, is expressed by the following formula:

$$Ld(\lambda) = -10 \log_{10}[1+(10^{(-Ld/10)}-1)/(1+4((\lambda md-\lambda)/W)^2)] \qquad (3)$$

where $\lambda md$ is the maximum loss wavelength, Ld[dB] is the maximum/minimum loss difference, and W is the parameter showing the hindrance bandwidth.

As obvious from the formulae (1)–(3), the loss wavelength characteristic function $Lg(\lambda)$ of the equalizer constructed by combining the dielectric multilayer filter with the etalon filter, is a function of the wavelength $\lambda$ containing parameters the number of which (six parameters $\lambda me$, Le, FSR, $\lambda md$, Ld and W in the case of using the both one by one) corresponds to the number of the optical filters to be used. If a value of each parameter is determined so that a difference between a loss in the wavelength $\lambda$ expressed by the above function and a total gain, in the same wavelength, of the components (the optical amplifier and the transmission line) within the block 26 excluding the gain equalizer 24, takes a fixed value with respect to each wavelength $\lambda$ within a certain wavelength range, it is feasible to manufacture the gain equalizer 22 capable of equalizing the gain with respect to each wavelength within the same wavelength range. The above determination of the parameter value can be made in various procedures, however, the value of each parameter is determined herein in the following procedures.

To begin with, a gain deviation wavelength characteristic (FIG. 4) of the gain equalization target module is obtained based on real measurement data of the total gain wavelength characteristic of the module (the gain equalization target module) consisting of the components excluding the gain equalizer 24 in the block 26. Herein, an equalizer loss of 7 dB is allowed, and a gain deviation $\Delta G(\lambda)$ is set to a value obtained by subtracting a gain smaller by 7 dB than the maximum gain from the gain in the wavelength $\lambda$. To be more specific, the gain deviation $\Delta(\lambda)$ becomes "0" with two wavelengths $\lambda s$, $\lambda e(\lambda s<\lambda e)$ in which the gain smaller by 7 dB than the maximum gain is obtained.

Next, a value of each parameter and a value of Lo are obtained so that $\Delta G(\lambda)+Lo$ and $Lg(\lambda)$ take much the same (very approximate) value on condition that the value of $\lambda$ falls within a range of $\lambda s-\lambda e$ (the wavelength range B in FIG. 4) by executing a computer analysis. Herein, Lo is the parameter indicating an excessive loss quantity, and is introduced in order to obtain a parameter for making $Lg(\lambda)$ coincident with $\Delta G(\lambda)+Lo$ within a range wider than the wavelength area B. As already explained, the excessive loss is desirably small. Therefore, the fitting is carried out on condition that the parameter capable of reducing the value of Lo and causing no problem with a small number of optical filters is to be obtained.

Figure 6:
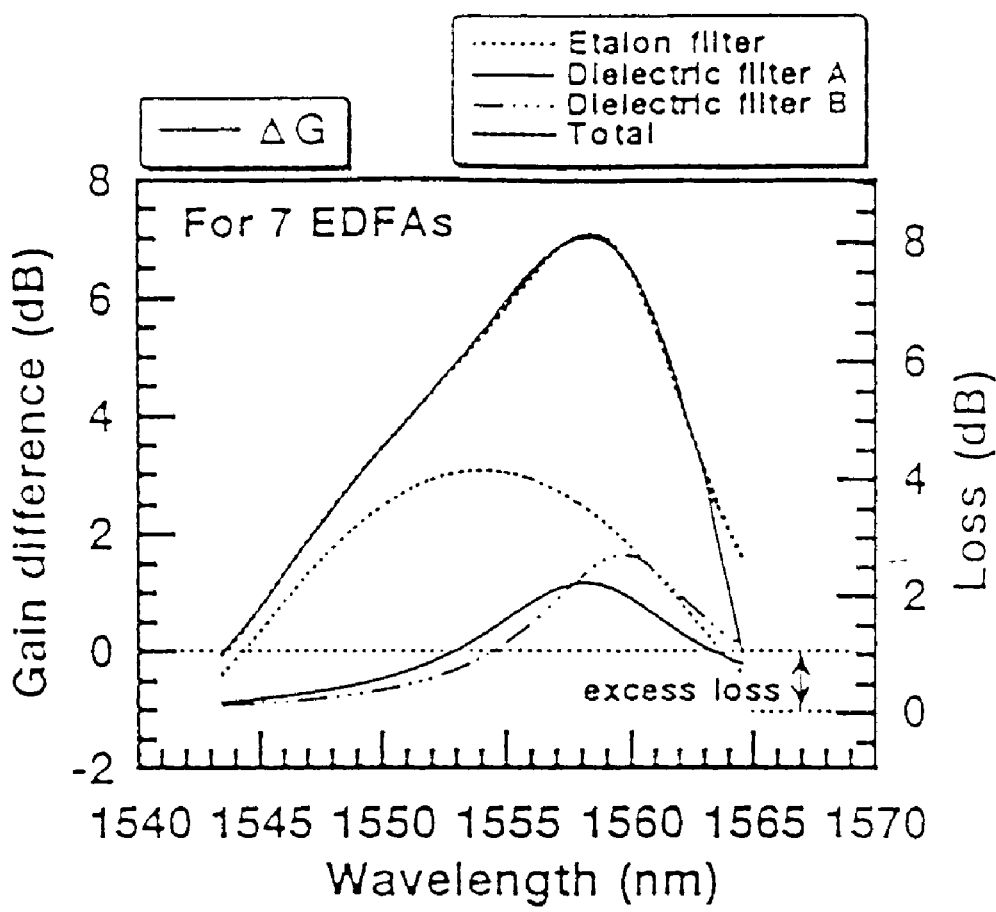
FIG. 6 is a diagram showing a construction and a performance of a gain equalizer in the embodiment of the present invention.

As a result, when using one etalon filter and two dielectric multilayer filters that exhibit loss wavelength characteristics shown in FIG. 6, it proved that the gain in the wavelength range having, as shown in FIG. 6, an excessive loss of approximately 1 dB and a width of nearly 20 nm, can be equalized.

The wavelength division multiplex optical amplification transmission system is constructed by using, as the optical filter 25, the single etalon filter and the two dielectric multilayer filters that are manufactured to exhibit the thus obtained loss wavelength characteristics.

Herein, as discussed above, the gain wavelength characteristic of the portion that should be equalized is set to exhibit the simple peak characteristic within the equalization target wavelength range, and the symmetry remains ill-balanced. Besides, when the gain equalizer is designed by combining only the optical filters in which the loss wavelength characteristic shows the simple peak characteristic within the equalization target wavelength range, the preferable result is acquired. The reason why so will be briefly elucidated.

Figure 7A:
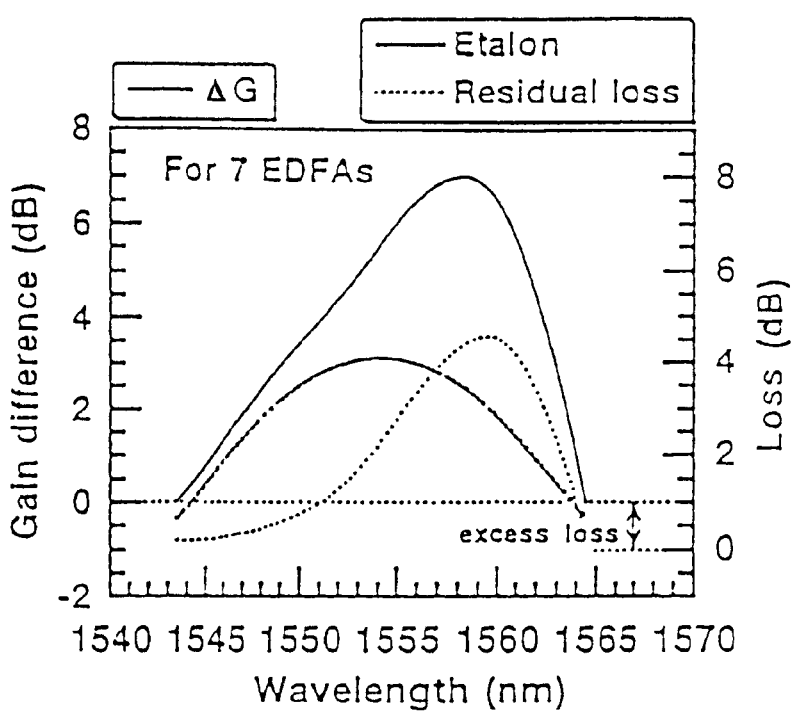
FIGS. 7A and 7B are diagrams, showing a loss wavelength characteristic, of assistance of explaining a difference between the present invention and the prior art.
Figure 7B:
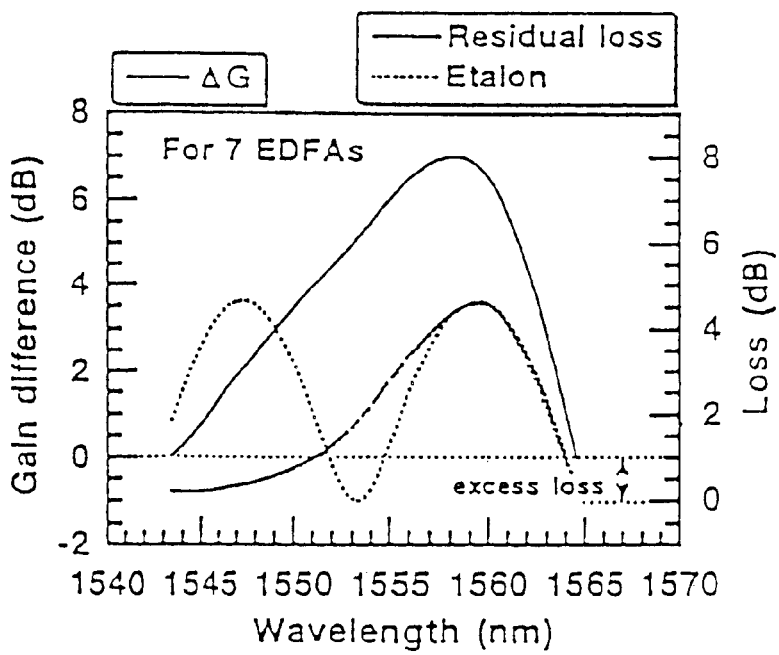
Figure 8:
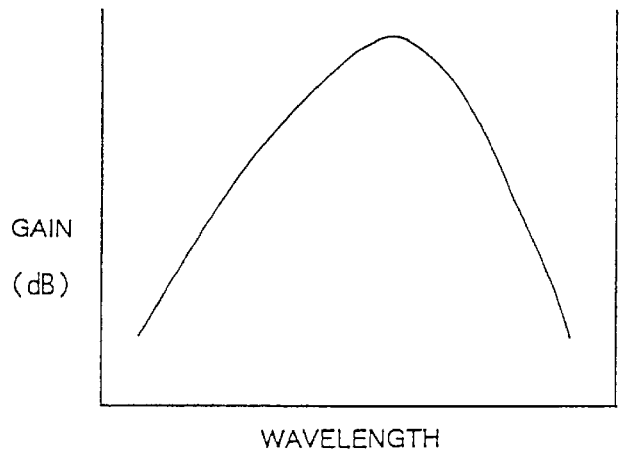
FIG. 8 is an explanatory diagram showing a gain wavelength characteristic of EDFA.
Figure 9:
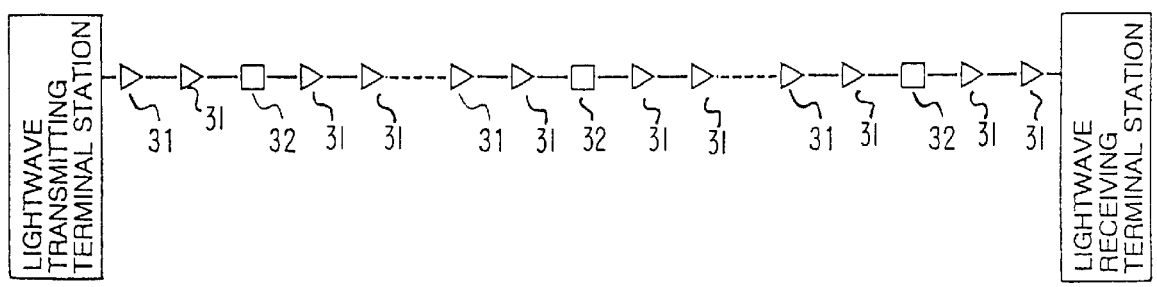
FIG. 9 is a block diagram illustrating a prior art wavelength division multiplex optical amplification transmission system including a gain equalizer.
Figure 10A:
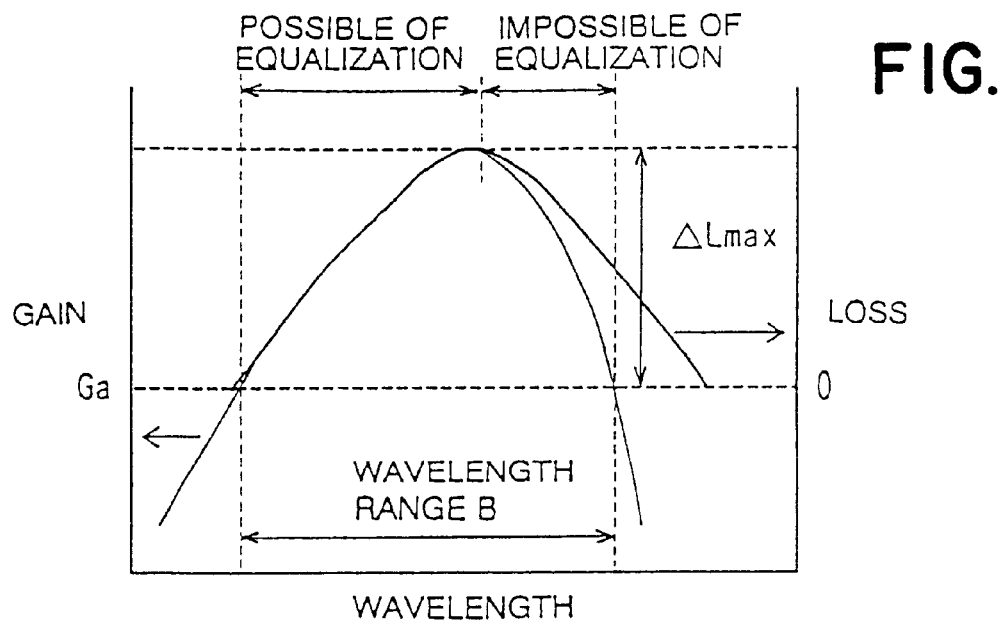
FIGS. 10A and 10B are explanatory diagrams showing a characteristic of which the gain equalizer is demanded.
Figure 10B:
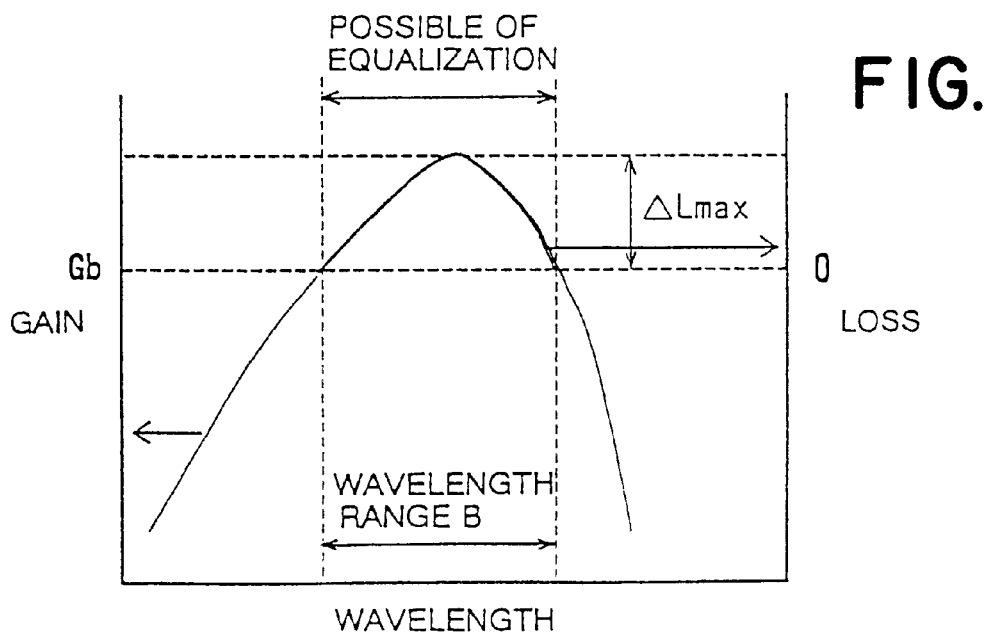
Figure 11:
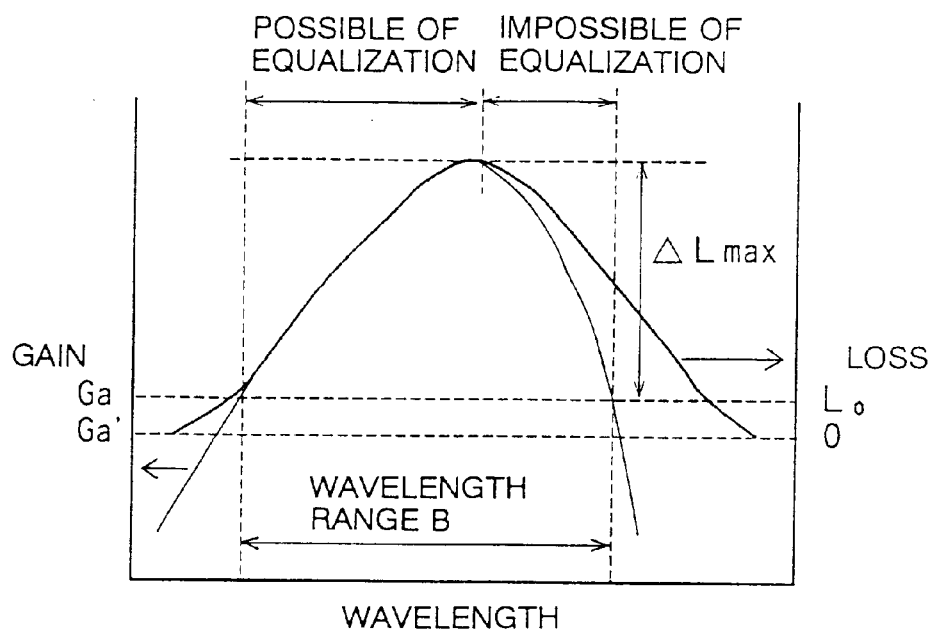
FIG. 11 is an explanatory diagram showing an excessive loss of the gain equalizer.
Figure 12:
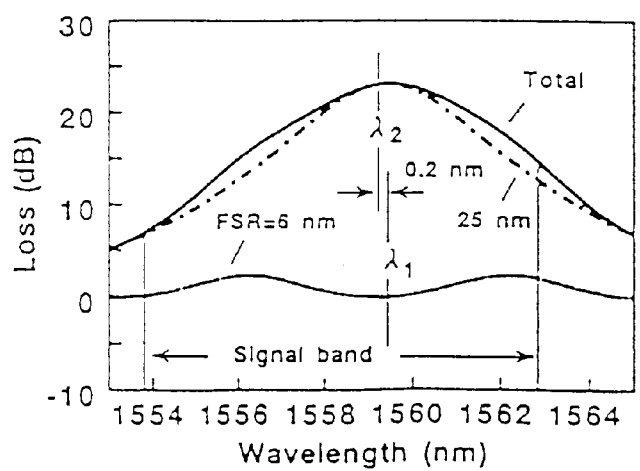
FIG. 12 is a diagram showing a loss wavelength characteristic of the gain equalizer constructed by combining Mach-Zehnder filters.

Considered is a case of designing the gain equalizer using only periodical optical filters with respect to the equalization target portion exhibiting the gain wavelength characteristic shown in FIG. 4. In this case, there must be diverse methods. Normally, however, an optical filter (a first optical filter) having a loss wavelength characteristic as shown in FIG. 7(A) is contained, and a loss (a loss left without being compensated; residual loss) in which the first optical filter lacks, is to be compensated. However, the symmetry of the gain wavelength characteristic defined as a compensation target is ill-balanced, and hence the residual loss wavelength characteristic assumes a configuration that is hard to be compensated by the periodic optical filter. For example, when compensating the residual loss wavelength characteristic shown in FIG. 7(A), as shown in FIG. 7(B), there might be produced a situation of being unclear as to whether the characteristic is compensated or not. As a matter of fact, although it is feasible to attain a state enough to equalize the gain by combining a multiplicity of the periodical optical filters, the residual loss increases when using the multiplicity of the optical filters.

Thus, the asymmetric gain wavelength characteristic is compensated with a difficulty according to the prior art method. By contrast, the present method involves the use of not the periodical optical filters but the optical filters having the loss wavelength characteristic exhibiting the simple peak characteristic within the equalization target wavelength range, and therefore, as shown in FIG. 6, the asymmetrical gain wavelength characteristic can be easily compensated in a state of causing a small quantity of excessive loss. In other words, when adopting the present construction, it is feasible to surely obtain the gain equalizer capable of equalizing the gain within a broad wavelength range, and hence it follows that the wavelength division multiplex optical amplification transmission system having the broad signal wavelength band can be easily actualized.

It is apparent that, in this invention, a wide range of different working modes can be formed based on the invention without deviating from the spirit and scope of the invention. This invention is not restricted by its specific working modes except being limited by the appended claims.

What is claimed is:

1. A wavelength division multiplex optical amplification transmission system comprising:

a lightwave transmitting terminal station for multiplexing a plurality of optical signals having wavelengths different from each other and transmitting the optical signals;

a transmission line comprising a plurality of optical amplifiers serially connected with a plurality of optical filters; and a lightwave receiving terminal station for receiving the plurality of optical signals transmitted by said lightwave transmitting terminal station via said transmission line, wherein: each of said plurality of optical amplifiers has a single peak gain wavelength characteristic in which a gain maximum wavelength value with a maximum gain exists in a wavelength range containing all wavelengths of the plurality of optical signals, the gain simply decreases as a distance from the gain maximum wavelength value increases within the wavelength range, and each said gain wavelength characteristic is asymmetrical with respect to the gain maximum wavelength value;

each of said plurality of optical filters exhibits a loss wavelength characteristic which has a characteristic of a single peak in a respective predetermined wavelength range, and each respective predetermined wavelength range is included in the wavelength range of the optical amplifier having the single peak; and a combined loss wavelength characteristic obtained by adding the loss wavelength characteristics of each of said plurality of optical filters is relatively coincident in terms of values with a combined gain wavelength characteristic obtained by adding the gain wavelength characteristics of each of said plurality of optical amplifiers within the wavelength range, said optical filters having at least two different loss wavelength characteristics.

2. A wavelength division multiplex optical amplification transmission system according to claim 1, wherein each of said plurality of optical amplifiers is an erbium-doped fiber amplifier a gain peak wavelength of which is in the vicinity of 1558 nm.

3. A wavelength division multiplex optical amplification transmission system according to claim 1, wherein at least one of said plurality of optical filters is a dielectric multi-layer filter.

4. A wavelength division multiplex optical amplification transmission system according to claim 1, wherein each of said plurality of optical filters is an etalon filter or a dielectric multilayer filter.

5. A wavelength division multiplex optical amplification transmission system comprising:

a lightwave transmitting terminal station for multiplexing a plurality of optical signals having wavelengths different from each other and transmitting the optical signals;

a transmission line comprising a predetermined number of serially connected optical transmission line blocks; and a lightwave receiving terminal station for receiving the plurality of optical signals transmitted by said lightwave transmitting terminal station via said transmission line;

wherein: each of said transmission line blocks comprises a plurality of optical amplifiers and a gain equalizer, each said amplifier having a single peak gain wavelength characteristic in which a gain maximum wavelength value with a maximum gain exists in a wavelength range containing all wavelengths of the plurality of optical signals, the gain simply decreases as a distance from the gain maximum wavelength value increases within the wavelength range, and each said gain wavelength characteristic is asymmetrical with respect to the gain maximum wavelength value;

said gain equalizer comprises a plurality of optical filters, each of said optical filters having a characteristic of a single peak in a respective predetermined wavelength range, and each respective predetermined wavelength range is included in the wavelength range of the optical amplifier having the single peak;, and a combined loss wavelength characteristic of said equalizer obtained by adding the loss wavelength characteristics of each of said plurality of optical filters is relatively coincident with a combined gain wavelength characteristic obtained by adding the gain wavelength characteristics of each of said plurality of optical amplifiers in said block within the wavelength range, said optical filters having at least two different loss wavelength characteristics.

6. An optical amplifier for amplifying a plurality of wavelength-multiplexed optical signals, comprising:

an optical amplifying unit exhibiting a single peak gain wavelength characteristic in which a gain maximum wavelength value with a maximum gain exists in a wavelength range containing all wavelengths of the plurality of optical signals, the gain simply decreases as a distance from the gain maximum wavelength value increases within the wavelength range, and the gain wavelength characteristic is asymmetrical with respect to the gain maximum wavelength value;

a gain equalizing unit comprising a plurality of optical filters, each of said plurality of optical filters having a characteristic of a single peak in a respective predetermined wavelength range, and each respective predetermined wavelength range is included in the wavelength range of the optical amplifier unit having the single peak;, wherein a combined loss wavelength characteristic obtained by adding the loss wavelength characteristics of each of said plurality of optical filters is relatively coincident with the gain wavelength characteristic of said optical amplifying unit within the wavelength range said optical filters having at least two different loss wavelength characteristics.

7. An optical amplifier for amplifying a plurality of wavelength-multiplexed optical signals, comprising:

an optical amplifying unit exhibiting an asymmetrical single peak gain wavelength characteristic over a wavelength range; and a plurality of optical filters serially connected with said optical amplifying unit, said plurality of optical filters exhibiting a combined loss wavelength characteristic relatively coincident with the gain wavelength characteristic of the optical amplifying unit, wherein each of said plurality of optical filters has a single peak loss wavelength characteristic and the loss wavelength characteristic of a first of said plurality of optical filters differs from the loss wavelength characteristic of a second of said plurality of optical filters.

8. An optical amplifier for amplifying a plurality of wavelength-multiplexed optical signals as claimed in claim 7 wherein the first of said plurality of optical filters is an Etalon filter and the second of said plurality of optical filters is a dielectric filter.

9. An optical amplifier for amplifying a plurality of wavelength-multiplexed optical signals as claimed in claim 8 wherein a third of said plurality of optical filters is a second dielectric filter.

10. An optical amplifier for amplifying a plurality of wavelength-multiplexed optical signals as claimed in claim 7, wherein the optical amplifier unit comprises a high-concentration, Al added erbium doped fiber amplifier.

* * * * *